United States Patent [19]
Sonderegger et al.

[11] Patent Number: 5,859,978
[45] Date of Patent: Jan. 12, 1999

[54] MANAGING APPLICATION PROGRAMS IN A COMPUTER NETWORK BY USING A DATABASE OF APPLICATION OBJECTS

[75] Inventors: Kelly E. Sonderegger; Kevin L. Hopton; Matthew G. Brooks; Andy Lawrence, all of Orem; Damon Janis; Lori K. Dayton, both of Provo; Thomas B. Oldroyd, Orem, all of Utah

[73] Assignee: Novell, Inc., Provo, Utah

[21] Appl. No.: 863,860

[22] Filed: May 27, 1997

Related U.S. Application Data

[62] Division of Ser. No. 499,711, Jul. 7, 1995, Pat. No. 5,692,129.

[51] Int. Cl.[6] .................................................. G06F 15/173
[52] U.S. Cl. ...................... 395/200.56; 707/10; 707/103; 707/100; 375/200.52; 375/200.59; 375/200.31
[58] Field of Search ........................... 707/10, 103, 100; 395/200.59, 200.52, 200.56, 200.31

[56] References Cited

U.S. PATENT DOCUMENTS

| | | | |
|---|---|---|---|
| 4,555,775 | 11/1985 | Pike | 345/344 |
| 4,961,224 | 10/1990 | Yung | 380/25 |
| 5,109,486 | 4/1992 | Seymour | 395/200.54 |
| 5,265,250 | 11/1993 | Andrade et al. | 395/671 |
| 5,271,007 | 12/1993 | Kurahashi et al. | 370/351 |
| 5,276,883 | 1/1994 | Halliwell | 395/200.33 |
| 5,325,533 | 6/1994 | McInerney et al. | 395/701 |
| 5,341,478 | 8/1994 | Travis, Jr. et al. | 395/200.33 |
| 5,349,642 | 9/1994 | Kingdon | 380/25 |
| 5,355,497 | 10/1994 | Cohen-Levy | 707/200 |
| 5,367,635 | 11/1994 | Bauer et al. | 395/200.51 |
| 5,412,772 | 5/1995 | Monson | 345/335 |
| 5,414,845 | 5/1995 | Behm et al. | 395/674 |
| 5,423,003 | 6/1995 | Berteau | 370/254 |
| 5,423,034 | 6/1995 | Cohen-Levy et al. | 707/10 |
| 5,442,791 | 8/1995 | Wrabetz et al. | 395/674 |
| 5,491,796 | 2/1996 | Wanderer et al. | 395/200.54 |
| 5,522,077 | 5/1996 | Cuthbert et al. | 395/683 |
| 5,539,870 | 7/1996 | Conrad et al. | 345/352 |
| 5,572,724 | 11/1996 | Watanabe et al. | 707/200 |
| 5,592,676 | 1/1997 | Bonnafoux | 395/701 |
| 5,655,081 | 8/1997 | Bonnell et al. | 395/200.32 |
| 5,666,486 | 9/1997 | Alfieri et al. | 395/200.47 |
| 5,689,708 | 11/1997 | Regnier et al. | 395/200.59 |
| 5,729,682 | 3/1998 | Marquis et al. | 395/650 |

OTHER PUBLICATIONS

"Distributed Object System Framework ORB", K. Seki et al., *NEC Research and Development*, Jul. 1994, pp. 292–297.

"Method for Administering Domain Application Settings", Anonymous, *IBM Technical Disclosure Bulletin*, Apr. 1994, pp. 409–410.

(List continued on next page.)

*Primary Examiner*—Thomas G. Black
*Assistant Examiner*—Jean Raymond Homere
*Attorney, Agent, or Firm*—Computer Law ++

[57] ABSTRACT

A method and apparatus for management of application programs in a computer network are disclosed. A modified hierarchical database which includes application objects that represent applications and their execution environments is utilized. Administrator tools support the creation, deletion, and modification of application objects. Each application object includes the location of an executable code for a given application, an icon, a working directory name, drive mappings, printer port captures, command line parameters, and similar information. An application launcher queries the database and updates a list of available applications which is kept in the user's desktop. The launcher automatically launches specified applications when a user runs the launcher. The launcher also uses the information in the application object to setup resources needed by the application, to create a process that executes the application, and to clean up after the application terminates. Resource setup involves mapping drives and capturing printer ports as needed. The database, the launcher, and the administrator tools allow consistent tracking and use of information about application programs and their execution environments in the network.

26 Claims, 10 Drawing Sheets

OTHER PUBLICATIONS

"Graphic User Interface for the Distributed Computing Environment", Anonymous, *IBM Technical Disclosure Bulletin*, Jan. 1995, pp. 409–410.

K. McCloghrie et al., "Management Information Base for Network Management of TCP/IP–based Internets: MIB–II", Network Working Group, Mar. 1991, RFC 1212, pp. 1–15.

K. McCloghrie et al., "Management Information Base for Network Management of TCP/IP–based Internets: MIB–II", Network Working Group, Mar. 1991, RFC 1213, pp. 1–53.

K. McCloghrie et al., "Management Information Base for Network Management of TCP/IP–based Internets", Network Working Group, May 1990, RFC 1156, pp. 1–70.

MANAGING APPLICATION PROGRAMS IN A COMPUTER NETWORK BY USING A DATABASE OF APPLICATION OBJECTS

RELATED APPLICATIONS

This application is a division of U.S. patent application Ser. No. 08/499,711 filed Jul. 7, 1995, now U.S. Pat. No. 5,692,129.

FIELD OF THE INVENTION

The present invention relates to the management of application programs in a computer network, and more particularly to a method and apparatus for managing applications in a multi-server network through the use of application objects in a hierarchical directory services database.

TECHNICAL BACKGROUND OF THE INVENTION

It is not unusual for a modern computer network to contain several server machines as well as numerous client machines. The servers typically provide file access, printer access, and other services to users who are stationed at the client machines. Some large networks contain dozens of servers and hundreds of clients. The person responsible for administering the network is known as the "network administrator" or "administrator." Persons who use the network are known as "users." Administrators are also users.

A wide variety of application programs such as word processors, spreadsheets, database managers, program development tools, and the like (collectively, "applications") are typically found on one or more servers in the network. However, applications are often under-utilized. Sometimes a potential user does not know whether a particular application would be helpful because the user is unfamiliar with that application. Sometimes applications could be made available to those who would benefit from their use, but the necessary file access rights and execution environment have not been provided by the administrator. Sometimes a user who is familiar with an application does not realize that the application was recently placed on the network.

Even if a user wishes to execute a particular application and believes that the executable code for that application exists somewhere on the network, the user still must locate and access that code in order to utilize the application. Unfortunately, the executable codes for applications are often scattered amongst many servers, thereby making it difficult at times even for administrators to locate particular executable codes. The situation is much worse for users who are unfamiliar with the technical aspects of network organization and administration. Because such users are often unable to locate the desired executable codes and/or create appropriate execution environments, they are unnecessarily prevented from using helpful applications.

More experienced users often manually maintain records of the locations of certain application executables, but this approach has several drawbacks. Often, a user does not initially know where a particular executable is located. Scanning the directories of numerous servers to locate an executable is a possible approach. But scanning directories is potentially very time-consuming, particularly if it becomes necessary to attach the user's client machine to numerous servers to access their directories. Asking a network administrator where to find a particular program is also possible, but repeatedly answering such queries from many users takes significant time away from other tasks that require the administrator's attention and expertise. Keeping manual records requires maintenance each time an executable's location is changed, thereby cutting into the time the user and/or administrator could be devoting to other duties.

In addition to an executable code, other resources are typically required by an application before it can successfully execute. In some cases it is necessary to map drives, to capture printer ports, or to specify a working directory for files which will hold intermediate or final data produced by the application. Access to files or directories may require that the user have read, write, or other rights. In some network environments a particular application will run more efficiently or effectively if its execution is preceded by a set of commands found in a startup script, or if its execution is followed by a set of commands found in a shutdown script. Many applications allow or require parameters to be passed to the application's executable code on the same command line which invokes that code.

Thus, in addition to maintaining the location of the executable code, users and administrators who manually maintain records regarding applications often find it helpful or necessary to maintain additional information regarding the execution environment of each application, such as drive mappings, printer port requirements, working directory names, access rights, scripts, and command line parameters. In practice this additional information is at least as widely scattered as the executable codes and is often stored in different formats by different persons. Many users lack the expertise, the time, or both, to manually manage such information. After an application has been on the network for some time, it is not unusual for inconsistent versions of execution environment information to be found in different formats on different machines throughout the network.

Thus, it would be an advancement in the art to provide a computer-implemented method and apparatus for consistently tracking the location of application program executable codes in a network.

It would also be an advancement to provide such a method and apparatus which reduce the administrative effort associated with changes in the location of application program executable codes or changes in other information needed to execute an application.

It would be a further advancement to provide such a method and apparatus for consistently tracking and employing additional information used to execute an application program, such as drive mappings, printer port requirements, working directory names, scripts, and/or command line parameters.

Such a method and apparatus are disclosed and claimed herein.

BRIEF SUMMARY OF THE INVENTION

The present invention provides a method and apparatus for centrally managing application programs in a computer network. One aspect of the present invention provides a modified database schema. The database schema defines what type of resources can be represented in the database. The database provides network administrators with an efficient and effective way to determine what resources are available on the network, to provide fault-tolerance by making resources available even if a server on the network becomes unavailable, and to control the access of particular network users or groups of users to particular network resources.

The resources represented in the modified database include application programs, such as word processors and spreadsheets, that reside on the network. The modifications to the schema provided by the present invention support the creation, deletion, and alteration of application objects in the database. In one embodiment, administrative routines for managing application objects are provided through a "snap-in" module that extends the familiar NWAdmin tool presently used on Novell NetWare® networks.

Each application object represents one application program and its execution environment. Thus, in one embodiment each application object includes the location of at least one executable code for the application in question, a brief name which textually identifies the application, an icon which graphically identifies the application, the location of the application's working directory, the drive mappings and printer port captures needed by the application, and the command line parameters (if any) that should be passed to the application when it begins execution. Alternative embodiments of application objects include additional useful information such as a brief textual description ("blurb") describing the application to potential new users, a list of other users who can be contacted to answer questions about the application, licensing information, and scripts to run before and/or after execution of the application.

Collecting such information about each application into one application object in the database assists greatly in preventing the creation or use of inconsistent or obsolete information about the application. Moreover, application objects receive the beneficial characteristics of the database such as hierarchical organization, access control, replication of database objects to provide fault-tolerance, and access through familiar interface tools.

The present invention also provides an application launcher. In one embodiment, the application launcher allows a user to browse through the application objects which represent the applications available to that user and to view the information currently stored in the objects. The launcher also automatically launches specified "auto start" applications when a user runs the launcher. In addition, the launcher updates a list of available applications that is associated with the user's desktop by querying the database. The launcher's update capability relieves administrators of the need to manually update each user's desktop when a new application is added to the network or an established application is moved.

When it is requested to launch an application, the launcher uses the information in the application's database object to setup execution environment resources needed by the application, to then create a process which executes the application, and to finally clean up after the application terminates. Resource setup typically involves mapping drives and capturing printer ports as needed; setup may also involve running a startup script. After the application terminates, the launcher cleans up by unmapping drives, releasing captured ports, and detaching from servers as needed. Cleaning up also includes running a shutdown script if one is provided.

Thus, the present invention provides a computer-implemented method and apparatus for consistently tracking and employing information about application programs and their execution environments in a network. Consistency is achieved by gathering the information into a central database which is accessed through specified administrator tools and user interfaces. Database updates are readily performed with the administrator tools or by the application launcher, thereby reducing the effort associated with changes in the location of executables or in the other information needed to execute an application.

The features and advantages of the present invention will become more fully apparent through the following description and appended claims taken in conjunction with the accompanying drawings.

BRIEF DESCRIPTION OF THE DRAWINGS

To illustrate the manner in which the advantages and features of the invention are obtained, a more particular description of the invention summarized above will be rendered by reference to the appended drawings. Understanding that these drawings only provide selected embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
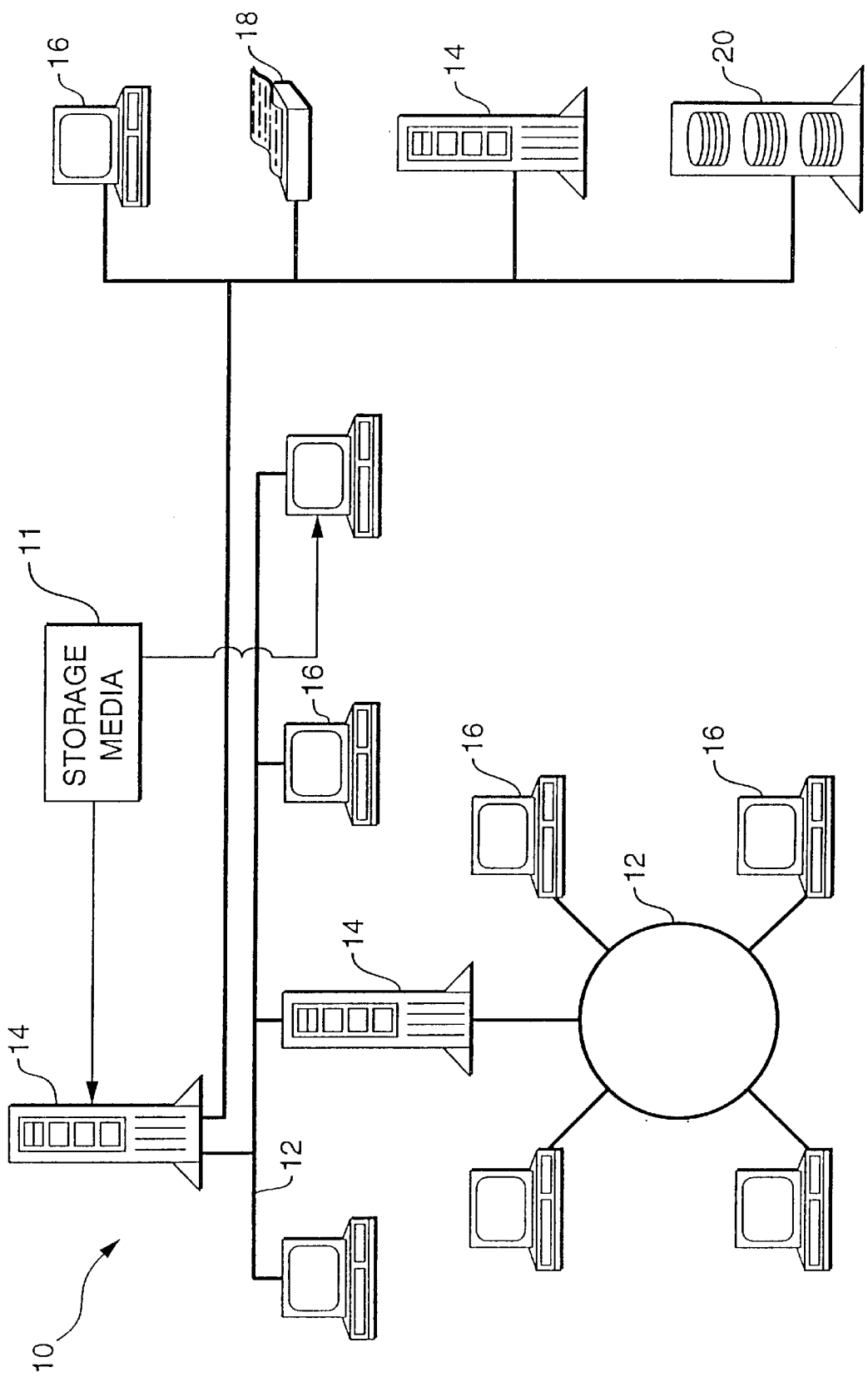
FIG. 1 is a diagram illustrating a computer network.

The present invention relates to a method and apparatus for managing application programs in a computer network that includes hardware, software, and data components. In describing the present invention and its context, the terms "program," "module," "routine," "subroutine," "function," and "procedure" are used interchangeably because the technical differences between these software components do not alter the scope of the present invention. The terms "object code," "executable code," and "executable" are likewise used interchangeably. As used herein, the term "embodiment" encompasses specific methods, specific apparatus, and specific program storage devices or articles of manufacture which are provided by the present invention.

Reference is now made to the figures wherein like parts are referred to by like numerals. One of the many networks suited for use with the present invention is indicated generally at 10 in FIG. 1. In one embodiment, the network 10 includes Novell NetWare® software, version 4.x (NetWare is a registered trademark of Novell, Inc.). The illustrated network 10 includes several connected local networks 12. Each local network 12 includes a file server 14 and one or more user stations 16. A printer 18 and an array of disks 20 are also attached to the network 10. Although a particular network 10 is shown, the present invention is also useful in a variety of other networks which are known to one of skill in the art.

Figure 2:
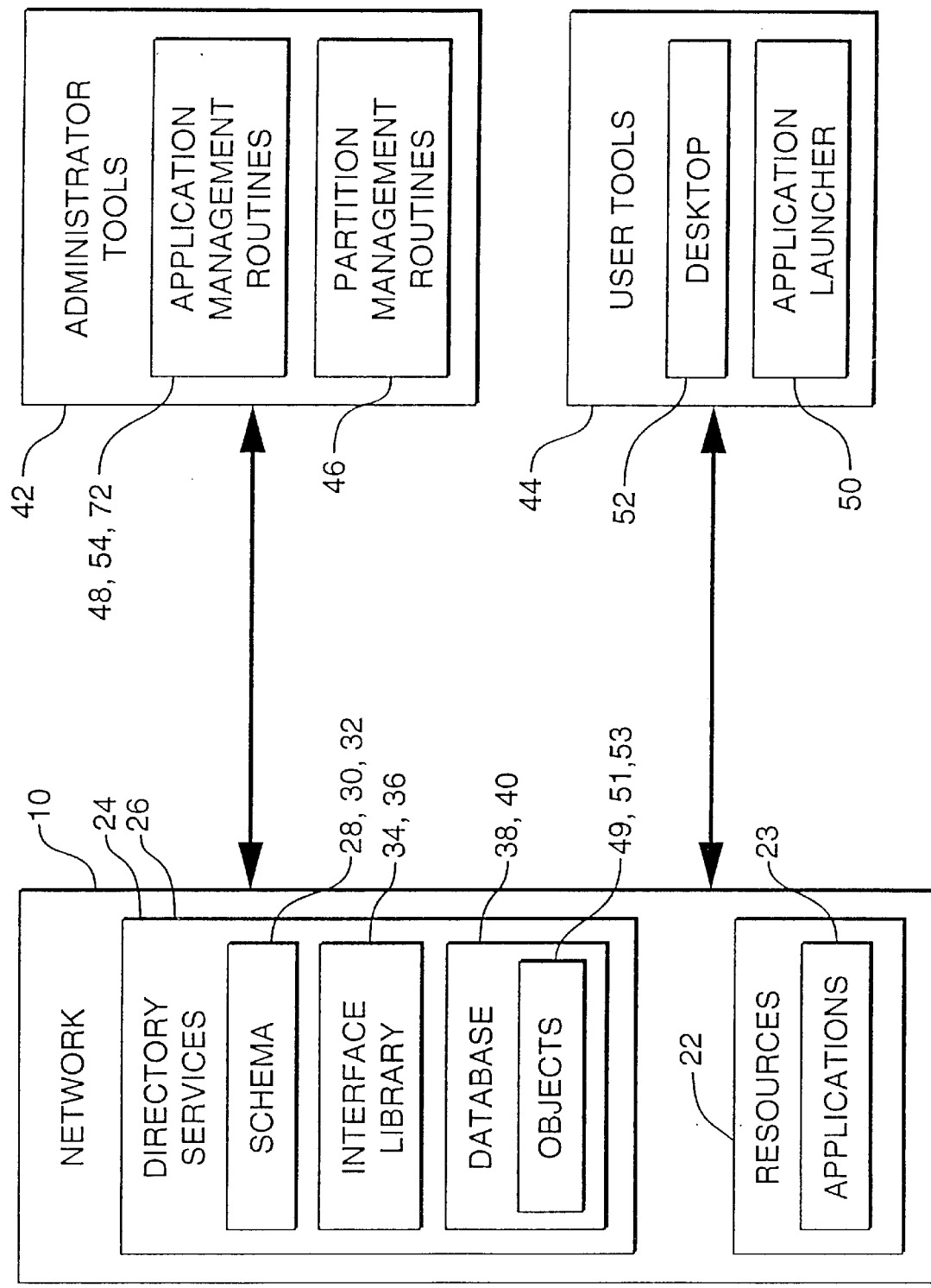
FIG. 2 is a diagram illustrating components of the computer network of FIG. 1 together with administrator tools and user tools employed in conjunction with the computer network.

With reference to FIGS. 1 and 2, administration and use of the network 10 are supported by network software and hardware elements, by administrator tools, and by user tools. FIG. 2 illustrates the relationship between these components. The network 10 includes a variety of resources 22, such as the printers 18, the disk array 20 and other storage devices, and applications 23 and data that are stored on one or more of the file servers 14 and user stations 16.

The network resources 22 are administered through certain directory services 24. The precise nature of the directory services 24 varies among different networks but in general the directory services 24 administer both the location of the resources 22 and the rights of network users to use the resources 22.

In a presently preferred embodiment the directory services 24 include services provided by NetWare Directory Services ("NDS") software 26 that is commercially available from Novell, Inc. of Orem, Utah (NetWare Directory Services is a trademark of Novell, Inc.). The directory services 24 component includes a schema 28. Prior to the present invention the schema 28 was a default schema 30 that did not support application objects. The schema 28 of the present invention is an extended schema 32 which does support application objects.

The schemas 28, 30, and 32 each include a set of "attribute syntax" definitions, a set of "attribute" definitions, and a set of "object class" (also known as "class") definitions. The NDS software 26 and the default NDS schema 30 are described in chapters 6 through 8 of *NetWare 4 for Professionals* by Bierer et al. ("Bierer"), which are incorporated herein by reference. Certain ideas explained in Bierer are repeated herein. The terms "attribute" and "property" are used interchangeably in Bierer and herein, as are the terms "attribute syntax" and "property syntax." Differences between the default schema 30 and the extended schema 32 of the present invention are described in detail below after a general discussion of the generic schema 28.

Each attribute syntax in the schema 28 is specified by an attribute syntax name and the kind and/or range of values that can be assigned to attributes of the given attribute syntax type. Attribute syntaxes thus correspond roughly to data types such as integer, float, string, or Boolean in conventional programming languages.

Each attribute in the schema 28 has certain information associated with it. Each attribute has an attribute name and an attribute syntax type. The attribute name identifies the attribute, while the attribute syntax limits the values that are assumed by the attribute. For instance, the default schema 30 includes an attribute of syntax type integer having the name "supported connections" which specifies the number of concurrent connections a file server allows.

Each attribute may also have associated with it any or all of the following flags: Non-removable, Hidden, Public Read, Read Only, Single-Valued, Sized, and String. The general meanings of these flags are familiar to those of skill in the art. If the Sized flag is set for a given attribute, then upper and lower bounds (possibly including No Limit) are imposed on values currently held by that attribute.

Each object class in the schema 28 also has certain information associated with it. Each class has a name which identifies this class, a set of super classes that identifies the other classes from which this class inherits attributes, and a set of containment classes that identifies the classes permitted to contain instances of this class. Although the topics of class inheritance, containment, and instantiation are familiar to those of skill in the art, their use in connection with application object classes according to the present invention is new.

Each object class also has a container flag and an effective flag. The container flag indicates whether the class is a container class, that is, whether it is capable of containing instances of other classes. The effective flag indicates whether instances of the class can be defined. Non-effective classes are used only to define attributes that will be inherited by other classes, whereas effective classes are used to define inheritable attributes, to define instances, or to define both.

In addition, each object class groups together certain attributes. The naming attributes of a class are those attributes that can be used to name instances of the class. The mandatory attributes of a class are those attributes that must exist in each valid instance of the class and/or become mandatory attributes of classes which inherit from the class. The optional attributes of a class are those attributes that may, but need not, exist in each valid instance of the class. Optional attributes of a parent class become optional attributes of a child class which inherits from the parent class, unless the attributes are mandatory in some other parent class from which the child inherits, in which case they are also mandatory in the child.

An object is an instance of an object class. Different objects of the same class have the same mandatory attributes but may have different current values in their corresponding mandatory attributes. Different objects of the same class may have different optional attributes, and/or different current values in their corresponding optional attributes.

The directory services 24 also include an interface library 34 which provides access to the schema 28 and to a database 38. The schema 28 is an API-extensible schema in that the attributes and object classes found in the schema can be altered through an Application Programmers' Interface ("API") without direct access to the source code that implements the schema 28. In some embodiments the interface library 34 includes tables or commands stored in a file which is read by the schema 28 during its initialization and when objects are created, thereby defining the available attributes and classes.

In addition or as an alternative, the interface library 34 includes a set of routines that are available to other code to access and modify the schema 28. In one embodiment the interface library 34 includes an API that defines an interface to an NWDSxxx() library 36 which is commercially available from Novell, Inc. of Orem, Utah. The NWDSxxx() library 36 is so named because the names of functions and data types defined in the library 36 typically begin with "NWDS," an acronym for "NetWare Directory Services." The use of particular elements of the NWDSxxx() library 36 in connection with the present invention is described hereafter.

The database 38 contains objects 49 and 51 that are defined according to the schema 28 and the particulars of the network 10. These objects 49 and 51 represent resources 22 of the network 10. The database 38 is a "hierarchical" database 38 because the objects 49 and 51 in the database 38 are connected in a hierarchical tree structure. Objects in the tree that can contain other objects are called "container objects" and must be instances of a container object class.

The database 38 is also a "synchronized-partition" database 38. The database 38 is typically divided into two or more non-overlapping partitions. To improve the response time to database 38 queries and to provide fault-tolerance, a replica of each partition is physically stored on one or more file servers 14 in the network 10. The replicas of a given partition are regularly updated by the directory services 24 through an automated synchronization process, thereby reducing the differences between replicas caused by activity on the network 10. In one embodiment, the database 38 includes a Novell NetWare Directory Services database ("NDS database") 40.

Administration and use of the resources 22 are supported by the directory services 24, by administrator tools 42, and by user tools 44. Typical administrator tools 42 include partition management routines 46 for managing the partitions of the database 38.

The present invention supplements the previously available administrator tools 42 by providing application management routines 48 for creating, deleting, and modifying application objects 49 and/or desktop attributes on user, group, and container objects 51 in the database 38. The addition of application objects 49 to the database 38 and other features of the present invention make application programs 23 available to network administrators and users in a previously unknown, uniform, convenient, and efficient manner.

The present invention also provides users with an application launcher 50 for initiating execution of applications 23 through their corresponding application objects 49. In addition, the present invention provides desktop attributes on user, group, and container objects 51 which modify previously known desktop environments 52 to facilitate the use of the application objects 49. User, group, container, and/or other objects 51 which have a desktop attribute are herein termed "desktop objects."

Figure 3:
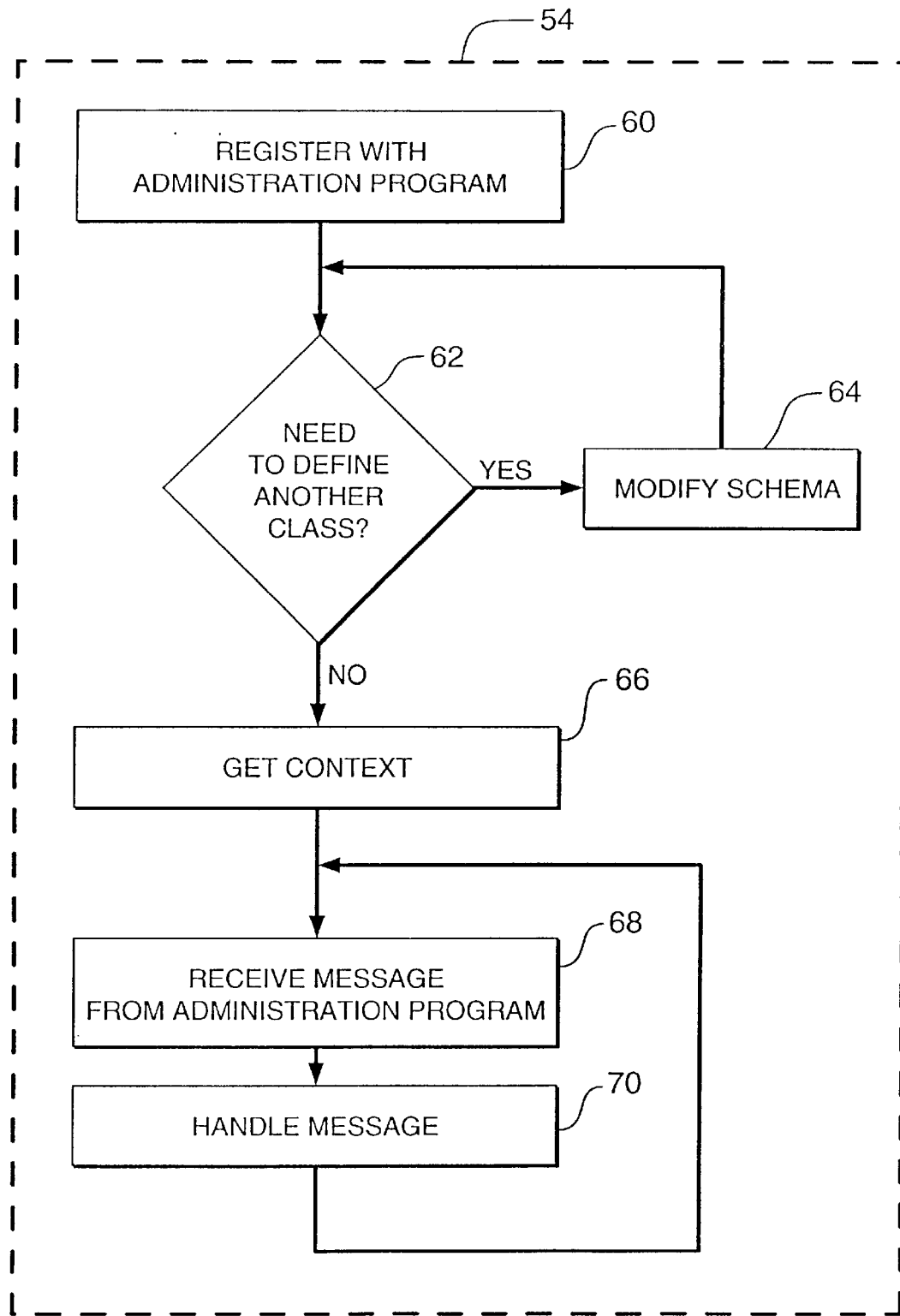
FIG. 3 is a flowchart illustrating an event-driven embodiment of application management routines according to the present invention for supplementing the administrator tools and the network shown in FIG. 2.

With reference to FIGS. 1, 2, and 3, the application management routines 48, as well as the schema 28 and the database 38, include a tangible embodiment stored in one or more program storage devices. Suitable storage devices include floppy disks, hard disks, tape, CD-ROMs, and other computer usable media. Each program storage device is readable by one or more of the file servers 14 and user stations 16. Each program storage device tangibly embodies a program, functions, or instructions that are executable by the machines 14 and/or 16 to perform application managing steps of the present invention as described herein.

In one embodiment the application management routines 48 are located in a "snap-in" module 54 stored in a .DLL file on a disk in the Microsoft® Windows™ environment ("Microsoft" is a registered trademark, and "Windows" is a trademark, of Microsoft Corporation). FIG. 3 illustrates steps that are taken by the snap-in module 54 to modify the directory services 24 in order to support the application management routines 48. Some of these steps modify the directory services schema 28. Modifications to the schema 28 include the addition of at least one class that defines application objects 49 and the addition of attributes which enhance the visibility and ease of use of those application objects 49. Other steps taken by the snap-in module 54 provide network administrators with control over application objects 49 by adding routines that allow administrators to create, modify, and delete the application objects 49 available to a given user, group, or container class.

One embodiment makes the new routines 48 available through the familiar NWAdmin tool interface, but those of skill in the art will appreciate that the routines 48 could also be provided in connection with programs other than NWAdmin. NWAdmin is a commercially available extendable tool used by network administrators to manage objects in the database 38. The module 54 extends NWAdmin to support application objects 49.

As shown in FIGS. 2 and 3, the initial step taken by the snap-in module 54 is a registration step 60 which registers the snap-in module 54 with NWAdmin. In alternative embodiments, the routines 48 are registered with another administration program to make them available for use by an administrator. During the registration step 60 menu items and procedures corresponding to operations on application objects 49 and desktop objects 51 are registered with NWAdmin by appropriate calls to the standard function NWARegisterObjectProc().

In one embodiment of the snap-in module 54 the first application object procedure registered is SnapinApplicationProc(), a function which receives and processes messages from NWAdmin. In response to the NWA_MSG_INITSNAPIN message, SnapinApplicationProc() initializes NWAPageStruct interface page structures titled "Identification," "Contacts," "Environment," "Options," "Scripts," "Licensing," and "View Associations," and registers corresponding menu item interface pages with NWAdmin. Appropriate titles for these structures and suitable groupings of the attributes and classes of the present invention under each title are readily determined by those of skill in the art. SnapinApplicationProc() also manages device context information in Windows environments and similar information in other environments. In addition, SnapinApplicationProc() invokes NWAAddClassData() to register with NWAdmin the bitmap and other interface information associated with new application object classes added by the snap-in module 54.

In response to the NWA_MSG_CREATEOBJECT message, SnapinApplicationProc() registers a dialog box which allows administrators to browse through executable files on the network 10, through existing application objects 49, or both, and to optionally invoke the necessary routines 48 to create a new application object 49. Browsing may be performed with a standard browsing tool.

In response to the NWA_MSG_GETVALIDOPERATIONS message, SnapinApplicationProc() registers the following set of bit-flags: NWA_OP_DETAILS, NWA_OP_RENAME, NWA_OP_DELETE, NWA_OP_DSTYPE, NWA_OP_CREATE. Those of skill will appreciate that different operations may be valid in other embodiments of the snap-in module 54 of the present invention.

In response to the NWA_MSG_GETPAGECOUNT message, SnapinApplicationProc() first invokes a snap-in function DSGetAliasedObjectName() which returns the name of the object 49 or 51 that is referenced by an alias if an alias is passed in and returns the name passed in if that name is not an alias. SnapinApplicationProc() then creates a local copy of the information in the object 49 to maintain a record of administrator modifications to the object 49 until such time, if any, as the administrator directs the snap-in module 54 to enter the modifications into the database 38. Finally, SnapinApplicationProc() returns the number of interface pages to NWAdmin.

In response to successive NWA_MSG_REGISTERPAGE messages (one for each interface page), SnapinApplicationProc() registers the next interface page with NWAdmin. Those of skill will appreciate that alternative embodiments of the present invention vary the order in which the pages are registered, as well as the specific manner in which information and operations regarding objects 49 and 51 are divided between the interface pages. User interface mechanisms other than interface pages are utilized in alternative embodiments.

In response to the NWA_MSG_MODIFY message, SnapinApplicationproc() invokes a snap-in function ModifyApplicationData() to modify the specified application object 49. Here and elsewhere throughout the snap-in module 54 the administrator is provided with appropriate error messages if a requested operation fails.

In response to the NWA_MSG_RENAME message, SnapinApplicationProc() simply returns NWA_RET_DODEFAULT. In response to the NWA_MSG_QUERYDELETE message, SnapinApplicationProc() removes any relevant licensing certificate and deletes the identified application object 49. Finally, in response to the NWA_MSG_CLOSESNAPIN message, SnapinApplicationProc() frees the memory it allocated, closes files (if any) that it opened, and otherwise cleans up. Some embodiments of SnapinApplicationProc() also invoke NWARemoveClassData() to remove the bitmaps added earlier to NWAdmin's class tables. Some embodiments remove the new application object classes from the schema 28; alternative embodiments leave the schema modifications in place after termination of the snap-in module 54.

In this embodiment of the registration step 60 of the snap-in module 54, the next application object procedure registered is SnapinDesktopProc(), which receives and processes messages from NWAdmin regarding desktop attributes on desktop objects 51 in a manner analogous to the manner in which SnapinApplicationProc() receives and processes messages regarding application objects 49. Thus, in response to NWA_MSG_INITSNAPIN, NWA_MSG_GETPAGECOUNT, and NWA_MSG_REGISTERPAGE messages, SnapinDesktopProc() creates and registers with NWAdmin an interface page titled "Desktop Objects." Likewise, SnapinDesktopProc() takes care to identify aliases and to allow changes to desktop attributes on desktop objects 51 in the database 38 only after confirmation by the administrator. Other SnapinDesktopProc() steps, such as modifying or closing steps, are readily determined by those of skill in the art according to the teachings herein.

With continued reference to FIG. 3, the registration step 60 is followed by a query step 62 and possibly by a modification step 64. The query step 62 determines whether additional modifications need to be made to the schema 28 in order to realize the present invention. Suitable modifications include defining new attributes and/or new object classes. In some embodiments the query step 62 queries the user to obtain authority to perform the identified modifications to the schema 28; in others, authority is presumed. If an additional modification is identified and authorized, it is performed during the modification step 64 in a manner which will be described in connection with FIGS. 5 through 7 hereafter. The query step 62 is then repeated until no further modifications are identified.

After the modifications to the schema 28 are completed, the snap-in module 54 performs a context capture step 66. In one embodiment, the context is captured by the following sequence of calls:

Context=CreateContext();
NWDSSetContext(Context, DCK_NAME_CONTEXT, DS_ROOT_NAME);
NWDSWhoAmI(Context, UserName);

The variable Context is of type NWDSContextHandle, and is a buffer used by NWDSxxx() calls. The variable UserName is an array of characters which contains the name of the user who is presently running NWAdmin. CreateContext() is a snap-in module 54 function which invokes NWDSCreateContext() to create a local copy of the context, calls NWDSGetContext() to initialize that local copy, and then sets the following bitflags in the context using NWDSSetContext(): DCV_TYPELESS_NAMES, DCV_XLATE_STRINGS, DCV_DEREF_ALIASES, DCV_DEREF_BASE_CLASS.

In modifying the database 38, care is taken to provide users of application objects 49 and desktop objects 51 with database rights which include both the object's current rights and the rights specified expressly or implicitly by the network administrator during use of the snap-in module 54.

After the context capture step 66, the snap-in module 54 goes into an event handling loop which includes a message reception step 68 and a message handling step 70. The event handling loop proceeds as set forth above in connection with the registered object procedures SnapinApplicationProc() and SnapinDesktopProc(), which receive the messages from NWAdmin and handle them accordingly. The event handling loop also supports conventional steps such as terminating the snap-in module 54.

Figure 4:
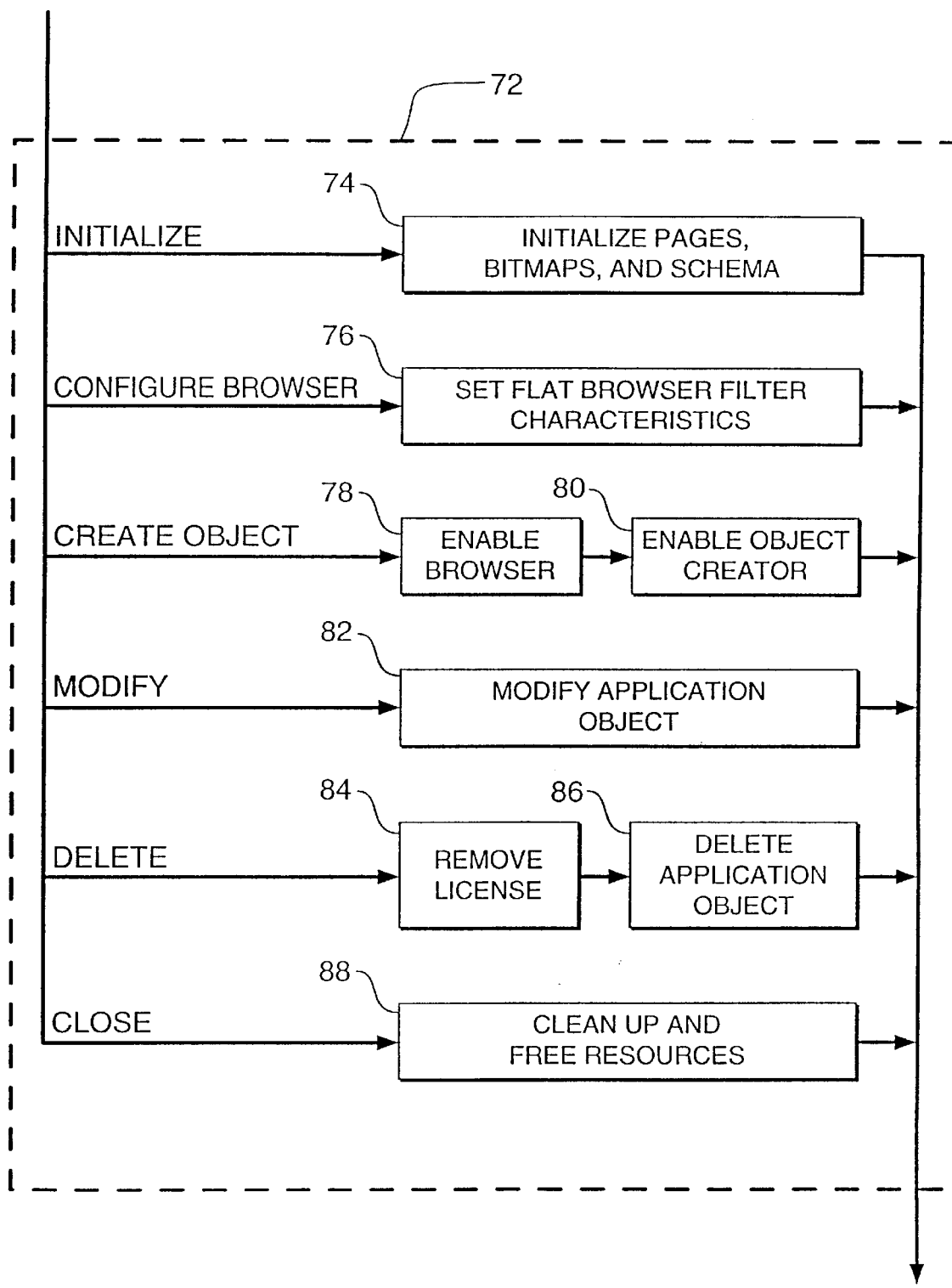
FIG. 4 is a flowchart illustrating an alternative command-driven embodiment of the application management routines of the present invention.

Although an event-driven administrator tool 54 is shown in FIG. 3, those of skill in the art will recognize that other programming paradigms are employed in alternative embodiments of the present invention. FIG. 4 illustrates one alternative embodiment of the routines 48 of FIG. 2 in the form of a command-driven administrator tool 72. The event-driven tool 54 and the command-driven tool 72 contain corresponding components which accomplish similar results. Additional paradigms are used in other embodiments of the present invention.

With reference to FIGS. 2, 3, and 4, the command-driven tool 72 responds to an "initialize" command with an initialization step 74 which initializes bitmaps, interface pages, menus, and other user interface elements in a manner analogous to the registration step 60 of the event-driven tool 54. In the embodiment shown in FIG. 4, the initialization step 74 also modifies the schema 28 to add new attributes and classes substantially as described in connection with FIGS. 5 through 7. If other software in the environment of the command-driven tool 72 requires page counts, page registration, identification of valid operations on the objects 49 and 51, or similar user interface information, that information is also provided by the tool 72 during the initialization step 74.

The command-driven tool 72 responds to a "configure browser" command with a browser configuration step 76 which sets default filter characteristics of a browser. Suitable browser filter characteristics include the name of an object class, a flag indicating whether to expand volumes during browsing, and a flag indicating whether to restrict selections to a single object 49 or 51. Suitable browser filter characteristics also include contextual information such as the user's name and location in the hierarchy of the network 10.

The command-driven tool 72 responds to a "create object" command with a browser enablement step 78 followed by an object creation enablement step 80. The browser enablement step 78 initiates or resumes execution of the browser, thereby allowing the administrator to scan the existing objects 49 and 51, files, and/or current attribute values. Browsing allows the administrator to determine whether an object 49 or 51 with some or all of the desired attributes and attribute values already exists. In one embodiment, the browser enablement step 78 initiates execution of a flat (non-hierarchical) browser by invoking NWALaunchFSFlatBrowser().

The object creation enablement step 80 obtains the path name of a new object 49 or 51 from the administrator. One embodiment converts the path name to a Universal Naming Convention ("UNC") path name if necessary. The object creation enablement step 80 creates an object 49 or 51 having the given name and other attribute values specified by the administrator or by default.

To create an application object 49, one embodiment of the step 80 first creates a local copy of the context by calling NWDSDuplicateContext(). NWDSSetContext() is then called to set the DCK_NAME_CONTEXT in the local copy of the context equal to the name of the container object in the database 38 that will contain the new application object 49. A buffer to hold the new application object 49's attribute values is allocated by calling NWDSAllocBuf() and initialized by calling NWDSInitBuf(). Mandatory attributes of the new application object 49 are initialized by calling NWDSPutAttrName() and NWDSPutAttrVal() for each attribute. Then NWDSAddObject() is invoked with the context and current mandatory attribute values as parameters to create the object 49 in the database 40. The new application object 49's icon data is stored in a file by calling NWDSOpenStream(), _lwrite(), and close(). Finally, the buffer and the local copy of the context are freed by calling NWDSFreeBuf() and NWDSFreeContext(). Similar steps are taken with desktop objects 51.

A modification step 82 taken in response to a "modify" command performs in a manner analogous to the message handling step 70 of the event-driven tool 54 to modify the attribute values of an application object 49. In one embodiment, the modification step 82 invokes NWDSGetSyntaxID(), NWDSPutChange(), and NWDSPutAttrVal() to modify application object 49 attributes after updating a local buffer. The local buffer is allocated and initialized substantially as in the object creation step 80 and then overwritten with the modifying values. The modification step 82 then invokes NWDSModifyObject() to make the requested changes.

A remove license step 84 is taken in response to a delete command. The remove license step 84 communicates with the licensing server and/or takes other steps readily determined by those of skill in the art to remove the license rights for the application 23. A delete application object step 86 then invokes standard NWDSxxx() or equivalent routines to delete the selected application object 49.

A close-and-clean-up step 88 closes opened files, detaches from the directory service 24, frees allocated memory, and takes similar steps in response to a "close" command. In one embodiment, the step 88 gives the administrator the option of restoring the database 38 and/or the schema 28 to their original condition prior to execution of the tool 72.

Figure 5:
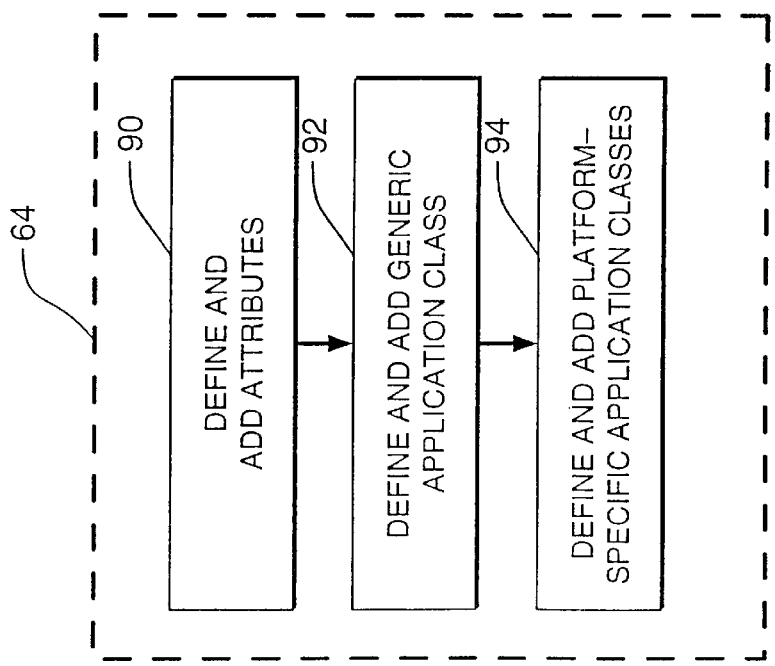
FIG. 5 is a flowchart further illustrating an application management routine for modifying a network database schema according to the present invention.
Figure 6:
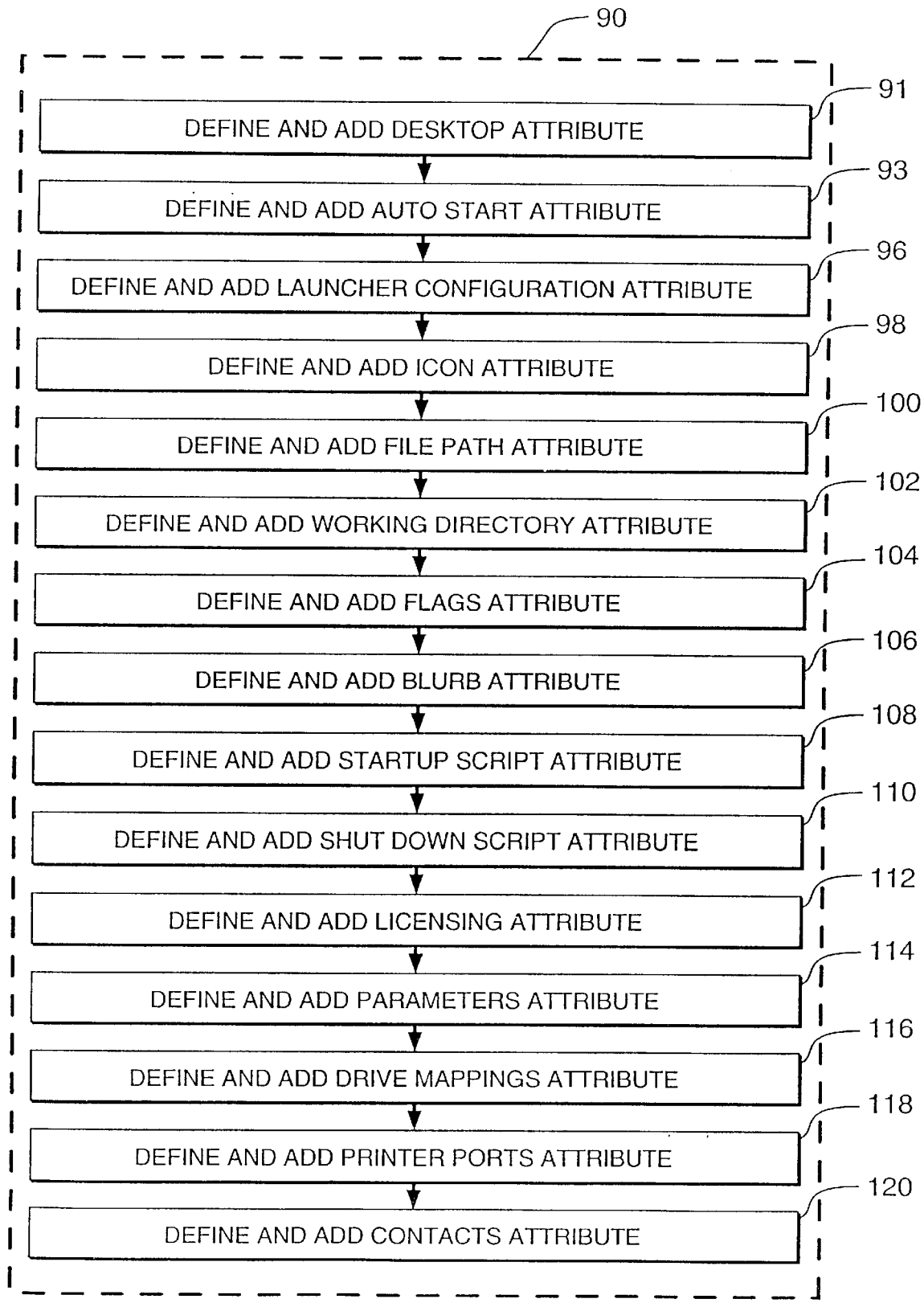
FIG. 6 is a flowchart further illustrating attribute definition and addition steps of the routine shown in FIG. 5.

As shown in FIGS. 2, 5, and 6, the schema modification step 64 includes an attribute definition and addition step 90 which in turn includes separate definition and addition steps 91 through 120 for new attributes which are added to the schema 28 according to the present invention. A description of the new attributes shown in FIG. 6 is provided below.

The step 91 defines and adds a "desktop" attribute having a distinguished name attribute syntax and no flags. The desktop attribute takes as its value a list of application objects 49 that should be displayed for a given desktop object 51. In an embodiment utilizing the NDS database 40, the desktop attribute is added to the User, Organizational Role, Group, Organizational Unit, and Organization classes. In a presently preferred embodiment, the desktop attribute is not added to the Organizational Role class because doing so degrades performance.

As used herein, the term "desktop object" includes any object 51 in the database 38 which is an instance of a class containing the desktop attribute. Associating desktop attributes with container classes allows application objects 49 to be located on desktops 52 that are accessible to more than one user. In alternative embodiments the desktop attribute is added to a subset of these classes and/or to other container classes such as Country.

When an application object 49 is added to the desktop attribute, care should be taken to give the desktop object 51 read and compare rights to all of the application object 49's attributes, as well as any other rights granted to the application 23's executable code file by the filesystem. Otherwise, users may be unable to launch and successfully execute an application 23 even though the network administrator attempted to enable them to do so by placing the application object 49 in a desktop object 51.

To define and add the desktop attribute, one embodiment of the step 91 invokes memset() to initialize a struct in RAM to hold the new attribute's values, and then sets the syntax type in that struct to indicate that the new desktop attribute has the distinguished name syntax type. This embodiment then invokes in turn NWDSDefineAttr(), NWDSAllocBuf(), NWDSInitBuf(), NWDSPutAttrName(), NWDSModifyClassDef(), and NWDSFreeBuf() with parameters readily determined by those familiar with these functions. The other attributes described herein are defined and added by analogous function calls, with parameter differences readily determined by those of skill in the art.

The step 93 defines and adds an "auto start" attribute having a typed name attribute syntax and no flags. The auto start attribute takes as its value a list of application objects 49 that should automatically run on the desktop 52 when the application launcher 50 is started from the desktop 52.

When the auto start attribute is created or modified, care should be taken to give each desktop object 51 read and compare rights to all the application object 49's attributes, as well as any other rights granted to the application 23 by the filesystem. Otherwise, an application 23 may fail to launch and successfully execute even though the network administrator placed the application object 49 in the auto start list.

The auto start attribute is added to the desktop classes. In one embodiment these classes include the User, Organizational Role, Group, Organizational Unit, and Organization classes. In alternative embodiments the auto start attribute is added to a subset of these classes and/or to other container classes such as Country. In a presently preferred embodiment, the auto start attribute is not added to the Organizational Role class because doing so degrades performance.

The step 96 defines and adds a "launcher configuration" attribute having a stream attribute syntax and having the Single-Valued flag. In one embodiment the launcher configuration attribute takes as its value a stream. In alternative embodiments an integer attribute syntax is used and the attribute's values are treated as bitflags and/or bitfields.

The launcher configuration attribute contains various indications regarding the desired behavior of the launcher 50. Suitable indications include an indication whether the application launcher 50 should use its default settings, indications regarding icon refresh, an indication whether a user is allowed to resize the window displaying the application object icons, an indication whether the application icons should be automatically sorted prior to their display, an indication whether the launcher 50's window size and position should be stored on the local disk drive, the number of container levels between the user's object and the root of the hierarchical database 38 which should be scanned for application object 49 icons to display, and an indication whether to allow the user to drag and drop icons out of the launcher 50 to the desktop 52.

Suitable refresh indications include an indication whether the user is allowed to manually refresh the application object 49 icons displayed on the desktop 52 and an indication whether the application object 49 icons should be automatically refreshed after each time interval of a specified length elapses. Icon refresh is discussed further in connection with FIG. 8. Other embodiments contain different launcher configuration indications.

When the launcher configuration attribute of a user or container object is modified, care should be taken to give the object read and compare rights to the launcher configuration attribute. In one embodiment, the launcher configuration attribute is added to the User, Organizational Unit, and Organization classes. In alternative embodiments the launcher configuration attribute is added to different or additional desktop classes.

The step 98 defines and adds an "icon" attribute having a stream attribute syntax and having the Single-Valued flag. In a preferred embodiment the icon attribute takes as its value a stream containing a list of application object 49 icons in the *.ICO file format. The icon attribute is added to a generic application objects class in the schema 28.

In conventional systems, icon data defining one or more icons for an application 23 is stored in the application 23's executable file. The icons that might be displayed on the desktop 52 are therefore typically scattered among multiple file servers 14 (FIG. 1). Using the present invention's icon attribute to hold an additional copy of some or all of this icon data allows icons for all of the application objects 49 that are visible to the user to be obtained from the central database 38. Thus, it is not necessary to attach to a server 14 that holds an available application 23 unless and until the user wishes to launch that application 23.

The step 100 defines and adds a "file path" attribute having a case ignore string attribute syntax and having the Single-Valued flag. In one embodiment the file path attribute takes as its value the full path (including server name) to the application object's *.EXE, *.COM, *.BAT, or other executable file. In alternative embodiments the server name is maintained in a separate case ignore string single-valued "server" attribute or a configurable default format. In some embodiments, the file path attribute is multi-valued rather than single-valued, and contains one or more executable file paths. Listing several file paths increases the possibility of launching an application 23 in the event a particular server 14 becomes unavailable. The file path attribute is added to the generic application objects class.

In some embodiments, fault tolerance is provided at a higher level by an application fault tolerance object 53 (FIG. 2). The application fault tolerance object 53 includes a list which references a plurality of application objects 49. One suitable embodiment of the list uses an "alternate application objects" attribute having a distinguished name attribute syntax and no flags. Alternatively, the alternate application objects attribute may be added to the generic application objects class.

Under one method of operation, the network administrator places application objects 49 in the same list if they differ only in which server 14 (FIG. 1) holds the executable code. Thus, the application launcher 50 could easily locate a replacement application object 49 to launch if a server 14 goes down. Alternatively, the "best" (i.e., newest, fastest, physically closest, located on least loaded server, or most reliable) version of an application 23 could be listed first, with less desirable versions following in order of decreasing desirability.

The step 102 defines and adds a "working directory" attribute having a case ignore string attribute syntax and having the Single-Valued flag. In one embodiment the working directory attribute takes as its value the full path (including server name) to the application's working directory. The working directory attribute is added to the generic application objects class.

The step 104 defines and adds a "flags" attribute having an integer attribute syntax and having the Single-Valued flag. In one alternative embodiment the flags attribute is multi-valued. The flags attribute value is treated as a bitset. In one embodiment the bits indicate whether to automatically minimize the application window and whether to restore the original drive mappings or printer port assignments after an application 23 terminates. The flags attribute is added to the generic application objects class.

The step 106 defines and adds a "blurb" attribute having a case ignore string attribute syntax and having the Single-Valued flag. The blurb value is a short description of the application 23 telling a user who may be unfamiliar with the application 23 what the application 23 provides and why the user might want to use the application 23. Like the icon attribute, the blurb attribute may be used as a brief identifier to access the application object 49 in the database 38. The blurb attribute is added to the generic application objects class.

The steps 108 and 110 define and add a "startup script" and a "shutdown script" attribute, respectively. Each script attribute has a stream attribute syntax and the Single-Valued flag. The startup script attribute value is a script to run before the application 23 executes, while the shutdown script attribute value is a script to run after the application 23 terminates. In one embodiment, each script is in NetWare Login Script format. The script attributes are added to the generic application objects class.

The step 112 defines and adds a "licensing" attribute having a stream attribute syntax and having the Single-Valued flag. In one embodiment, the licensing value includes information needed by the NetWare Licensing Server to verify the scope and validity of the application 23's license. The licensing attribute is added to the generic application objects class.

The step 114 defines and adds a "parameters" attribute having a case ignore string attribute syntax and having the Single-Valued flag. In one alternative embodiment the parameters attribute has a stream attribute syntax. The parameters attribute value includes command line parameters to be passed to the application 23 when it is launched. The parameters attribute is added to the generic application objects class.

The step 116 defines and adds a "drive mappings" attribute having a case ignore string attribute syntax. The drive mappings attribute value includes a list of drives which must be mapped by the application launcher 50 prior to executing the application 23. One suitable format is: Drive1:=Path1; Drive2:=Path2, and so forth. Other suitable formats follow the standard syntax for the NetWare MAP.EXE utility. The drive mappings attribute is added to the generic application objects class.

The step 118 defines and adds a "printer ports" attribute having a case ignore string attribute syntax. The printer ports attribute value includes a list of printer ports which must be captured by the application launcher 50 prior to executing the application 23. One suitable format is: Port1:=Queue1; Port2:=Queue2, and so forth. Other suitable formats follow the standard syntax for the NetWare CAPTURE.EXE utility. The printer ports attribute is added to the generic application objects class.

The step 120 defines and adds a "contacts" attribute having a distinguished name attribute syntax. The contacts attribute value includes a list of other network users who may be able to help if this user has a problem with the application 23. In general, the public should therefore be granted read rights to the contacts attribute in each application object. The contacts attribute is added to the generic application objects class.

Alternative embodiments of the present invention select different attributes to define application objects. By way of example and without limitation, some embodiments omit one or more of the attributes and attribute definition steps described above. Other embodiments omit only one or more of the following attributes: flags, blurb, startup script, shutdown script, licensing, and contacts. The user interface and other portions of these alternative embodiments contain corresponding changes readily determined by those of skill in the art. Other embodiments of the invention define one or more of the attributes differently than the illustrative description provided above. By way of example and not limitation, in alternative embodiments one or more of the attributes sets the Non-removable flag and/or uses a different attribute syntax.

In one alternative embodiment, the step 90 defines and adds a "handler" attribute having a distinguished name syntax and no flags. The handler attribute value includes a list of handlers such as *.INI handlers for the application 23. The handler attribute is added to the generic application objects class.

In one alternative embodiment, the step 90 defines and adds a "searchmap path" attribute having a distinguished name syntax and no flags. The searchmap path attribute value includes a list of directories to search for files referenced by the application 23 in a manner analogous to use of the familiar DOS search path. The searchmap path attribute is added to the generic application objects class.

In one alternative embodiment, the step 90 defines and adds a "catch-all" attribute having a stream syntax and no flags. The catch-all attribute value includes application-defined values, such as values in a generic data field, in order to satisfy prerequisites or to invoke options for execution of the application 23. The catch-all attribute is added to the generic application objects class.

In one alternative embodiment, a step of the present invention adds a "see also" attribute having a distinguished name syntax and no flags. The see also attribute value includes a list of desktop objects having a desktop attribute whose value includes the name of the application object 49. The see also attribute is added to the generic application objects class.

With reference to FIGS. 2 and 5, the step 90 of defining and adding new attributes is followed by the step 92 of defining and adding the generic application objects class. Creation of the generic class is followed by a step 94 which defines and adds one or more platform-specific application objects classes that inherit from the generic application objects class. The steps 92 and 94 are further illustrated in FIG. 7.

Definition and addition of a class in the schema 28 includes a step 122 of allocating and initializing a buffer to hold information about the new class. In one embodiment, the step 122 includes calls to NWDSAllocBuf() and NWDSInitBuf(). During a step 124 the super classes of the new class are defined by successive calls to NWDSBeginClassItem() and NWDSPutClassItem() or equivalent means. During a step 126 the containment classes of the new class are defined by similar successive calls to NWDSBeginClassItem() and NWDSPutClassItem() or equivalent means.

During additional steps 128, 130, and 132, the naming attributes, mandatory attributes, and optional attributes, respectively, of the new class are defined. In one embodiment each of the steps 128, 130, and 132 includes an initial call to NWDSBeginClassItem() followed by calls to NWDSPutClassItem() for each of the naming attributes, each of the mandatory attributes, and each of the optional attributes, respectively. Finally, NWDSDefineClass() is invoked to create the new class in the schema 28.

Figure 7:
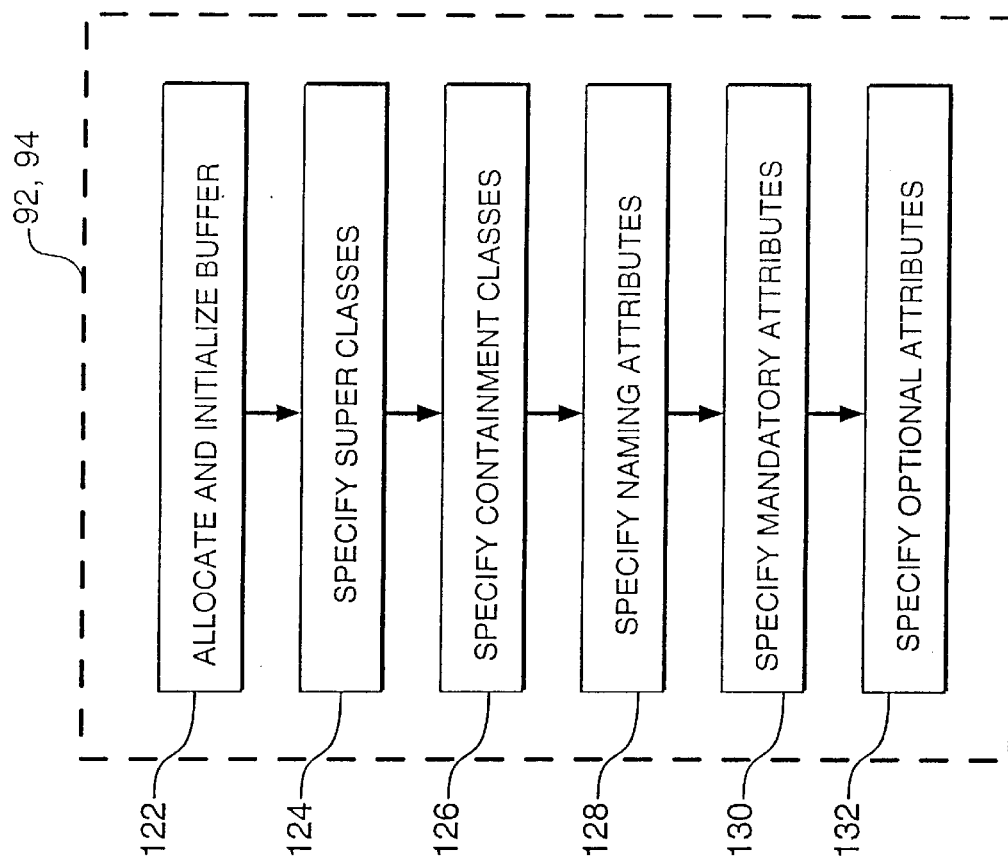
FIG. 7 is a flowchart further illustrating class definition and addition steps of the routine shown in FIG. 5.

With reference to FIGS. 2, 5, and 7, in one embodiment of the present invention the step 92 defines and adds to the schema 28 a generic application objects class which has Top as its superclass, and Organization and Organizational Unit as its containment classes. The generic application objects class is a noneffective container class having the familiar common name attribute as its naming attribute, and having mandatory attributes which include file path, description, and common name. The description attribute's value is a name that appears underneath the application 23's icon on the desktop 52. In one alternative embodiment the description attribute is optional rather than mandatory.

In another embodiment, the file path attribute is optional rather than mandatory. An application object would contain a script only, with no ultimate executable launched and turned over to the user. This would be particularly useful to perform software installation.

The generic class's optional attributes include the following attributes defined in the step 90 (FIG. 6): icon, working directory, flags, blurb, startup script, shutdown script, licensing, parameters, drive mappings, printer ports, and contacts. Other embodiments define the generic class differently, or omit the generic class entirely and use only platform-specific classes.

One embodiment of the step 94 defines and adds to the schema 28 a platform-specific Windows (version 3.x and/or Windows 95) application objects class which has the generic class defined in the step 92 as its superclass. This Windows application class is an effective non-container class which inherits the naming attributes, mandatory attributes, and optional attributes of the generic class. Other embodiments of the present invention similarly define other platform-specific classes for the DOS, Macintosh, OS/2, UNIX®, and/or NT® environments (OS/2 is a mark of International Business Machines Corporation; UNIX is a registered trademark of Novell, Inc.; NT is a registered trademark of Microsoft Corporation).

Figure 8:
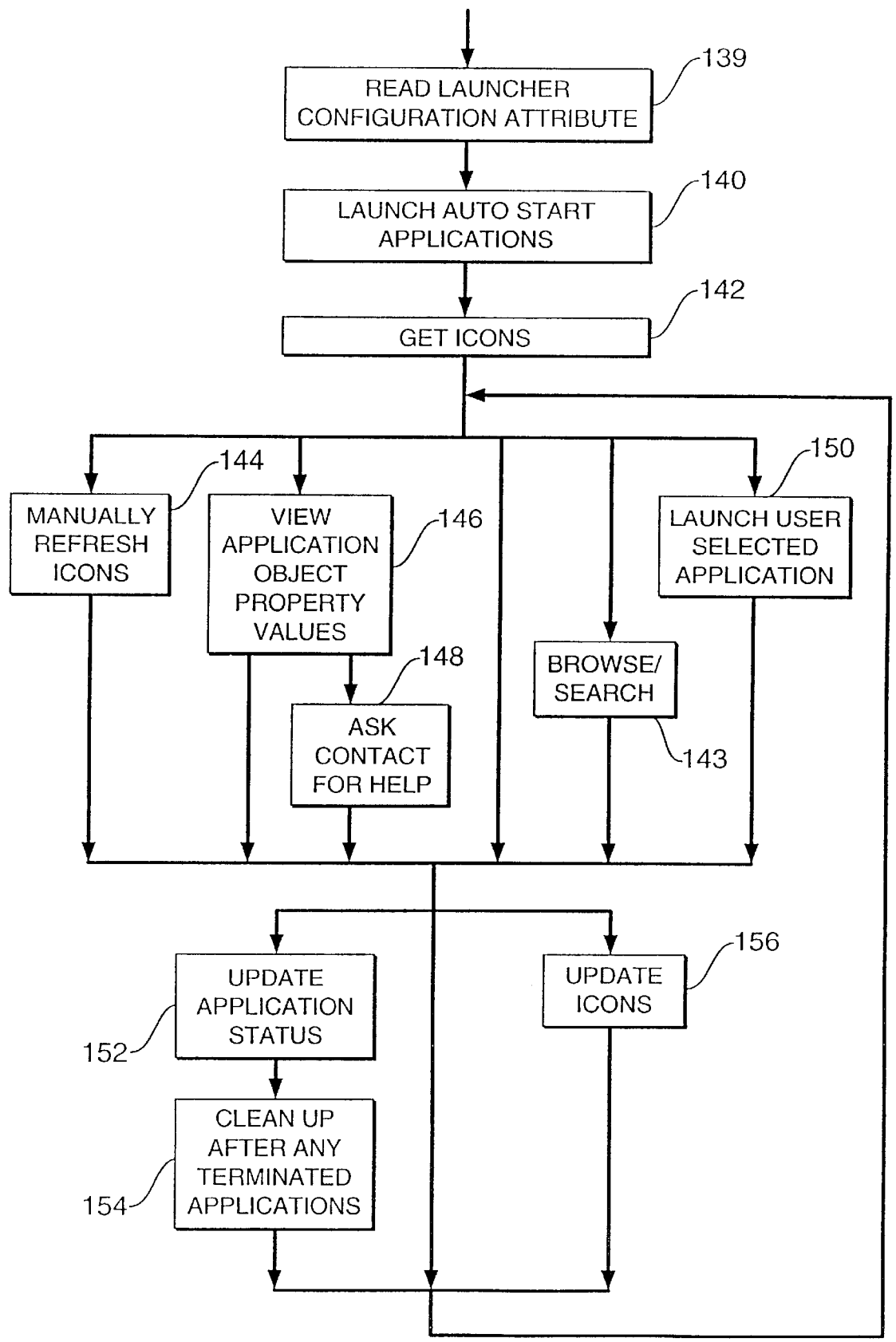
FIG. 8 is a flowchart further illustrating an application launcher according to the present invention.

With reference to FIGS. 2 and 8, the application launcher 50 is associated with the desktop environment 52. In some embodiments of the present invention, the application launcher 50 and the application management routines 48 are combined in a single tool, similar to NWAdmin. These embodiments allow a user to readily browse for application objects 49 and/or to perform a "Yellow Pages" search of the database 38 for a particular application object 49 and to then launch that application object 49. In other embodiments, the application launcher 50 performs a search within the database 38 by searching the desktop attribute in one or more desktop objects 51.

In "bootstrap" embodiments of the present invention, a small piece of code on the client 16 reads a user object's container object in the database 38 when a user logs on. The container object has a stream syntax "application launcher bootstrap" attribute which contains the executable code for the application launcher 50. One method of the present invention includes the step of reading executable launcher code from the application launcher bootstrap attribute in the database 38. After the bootstrap attribute value is read by the client 16, the application launcher 50 is executed. Storing the application launcher 50 in a stream attribute provides the advantages, such as replication and distribution, of storage in the database 38.

With reference to FIG. 8, the launcher 50 performs a reading step 139. During the reading step 139, the launcher 50 reads the current value of the launcher configuration attribute from the schema database 38 and stores that information in a local buffer.

In one embodiment, the value of the launcher configuration attribute, as well as the values of other attributes, are read from the schema database 38 substantially as follows. Two buffers are allocated in the schema 28 by invoking NWDSAllocBuf(). One buffer will hold the values of all attributes of an object 49 or 51, and the other will hold those values which are of interest. The first buffer is initialized by calling NWDSInitBuf(). Calls are then made to NWDSRead(), NWDSGetAttrCount(), NWDSGetAttrName(), and NWDSPutAttrName() to copy the values of interest from the first buffer into the second buffer. Finally, one call to NWDSGetAttrCount() and the corresponding number of calls to NWDSGetAttrName() are made to copy the values from the schema 28 into the launcher 50's memory. NWDSComputeAttrValSize() is called to determine the amount of memory needed by the launcher 50 to hold the attribute value(s) of interest. NWDSFreeBuf() is then called twice to free the two database 38 buffers.

The launcher 50 also performs an auto start launching step 140 to launch each of the applications 23 specified in the auto start attribute of the desktop object 51. Embodiments which omit the auto start definition step 93 (FIG. 6) also omit the auto start launching step 140. As elsewhere, error messages are provided to the user and/or to the network administrator if an attempted step fails.

As explained, the icon for an application 23 is preferably stored in the icon attribute in addition to its usual storage in the application 23's executable file. Accordingly, the application launcher 50 performs a get-icons step 142 to obtain from the directory services database 38 the icons of all applications 23 listed in the desktop attribute.

In one embodiment, the get-icons step 142 is accomplished using software which is based generally on the icon.c file in the October 1994 Microsoft Development Library CD-ROM distributed as part of the Microsoft Developer Network. In one embodiment, the icon.c file is modified in ways readily determined by those of skill in the art to work with the Borland Object Windows Library ("OWL") rather than the standard Windows API. Thus, the MakeIcon() function in icon.c is modified to return a pointer to an OWL Ticon structure rather than a Windows HICON structure. The ReadIcon() function in icon.c is modified to return the icon that best fits the available screen resolution, number of colors, and system metric for the icon size rather than simply reading the first icon. Alternative embodiments use other code to read the icon data from the icon attribute and/or to create a corresponding icon for display on the desktop 52.

During a browse/search step 143, the launcher 50 performs browsing and/or searching as requested by the user. Suitable browsers for performing the step 143 include without limitation familiar flat browsers, other familiar browsers, and browsers of the type provided in the NWAdmin tool. Searching during the step 143 may include specifying search parameters or using previously specified search parameters. Searching may also include a specification of how much of the hierarchical database 38 tree to search. Suitable search algorithms are readily determined by those of skill in the art, and include without limitation algorithms for "yellow page" searches of the type performed by NWAdmin.

After the icons are displayed on the desktop 52, the launcher 50 responds to commands or events provided by the user. One such command orders the launcher 50 to perform a manual icon refresh step 144. Icon refresh is useful because the network administrator may have added new application objects 49 to those available to the user, may have deleted other application objects 49, and/or may have changed the current attribute values of still other application objects 49 after the launcher 50 last read those values.

The launcher 50 maintains an internal list of application objects 49 for which icons are currently displayed. The manual refresh step 144 causes the launcher 50 to scan a portion of the database 38 to determine whether the launcher 50's internal list differs from the attributes listed in the desktop attribute of the desktop 52 in the database 38. The portion of the database 38 hierarchy searched is specified by the container levels value stored in the launcher configuration attribute of the user and container objects. In one embodiment timestamps are used to detect changes to the database 38. In another string comparison similar to that performed by strcmp() to detect name changes. Any differences detected are reflected in the internal list and other internal data of the launcher 50 and in the icons displayed on the terminal screen.

The user may also order the launcher 50 to perform a viewing step 146. The viewing step 146 displays the current values of predetermined attributes. One embodiment displays all of the attributes of application objects 49 whose icons are currently displayed to the user. The embodiment illustrated in FIG. 8 displays the attribute values but does not allow users to change those values. An alternative embodiment allows users to change the value of selected attributes, such as the parameters attribute and/or the contacts attribute.

In connection with the viewing step 146, the user is able to ask a contact for help during an asking step 148. In one embodiment, the asking step 148 includes viewing the current value of the contacts attribute, selecting a particular contact person, and then selecting that contact person's email address or telephone number. In response, the launcher 50 initiates email correspondence with the contact person or dials the contact person's telephone number, respectively, by invoking standard communications software. For instance, email correspondence is readily initiated by the launcher 50 through the Messaging API protocol promulgated by Microsoft or through other standard communications interfaces.

Of course, the user may also select a specific application 23 and order the launcher 50 to perform an application launching step 150. In an embodiment tailored to the Windows environment, the application 23 is selected for launching by double-clicking a mouse button after positioning a desktop cursor over the application 23's displayed icon. The launching step 150 is discussed below in connection with FIGS. 9 through 11.

With continued reference to FIGS. 2 and 8, the launcher 50 also takes certain steps not directly requested by the user. For instance, the launcher 50 maintains an internal structure that reflects the current status of each application 23 launched by the launcher 50. This status information includes user interface information such as drive mappings, printer port captures, and server attachments made by the launcher 50 before launching the application 23; and an indication whether the application 23 has terminated. The launcher 50 detects termination of an application 23 by polling, by an interrupt or event notification, or by other familiar means. Changes in the application 23's status are reflected in the launcher 50's internal structure during a status updating step 152.

If an application 23 launched by the launcher 50 terminates, the launcher 50 updates the status information and then cleans up during a cleaning step 154. The cleaning step 154, which proceeds according to the settings in the application object's flags attribute, possibly includes unmapping drives, releasing captured printer ports, detaching from servers 14 (FIG. 1), and releasing memory used internally by the launcher 50 to hold the application's status information.

If the launcher configuration attribute indicates that icons should be automatically refreshed, then an icon updating step 156 is also performed without a direct user request. Aside from being initiated by the launcher 50, the icon updating step 156 is substantially similar to the user-initiated manual icon refresh step 144. Both of the steps 144 and 156 are performed to reduce the workload of the network administrator by reducing or eliminating the need for the administrator to manually update user desktops 52 after changing the application objects 49 in the schema database 38.

Figure 9:
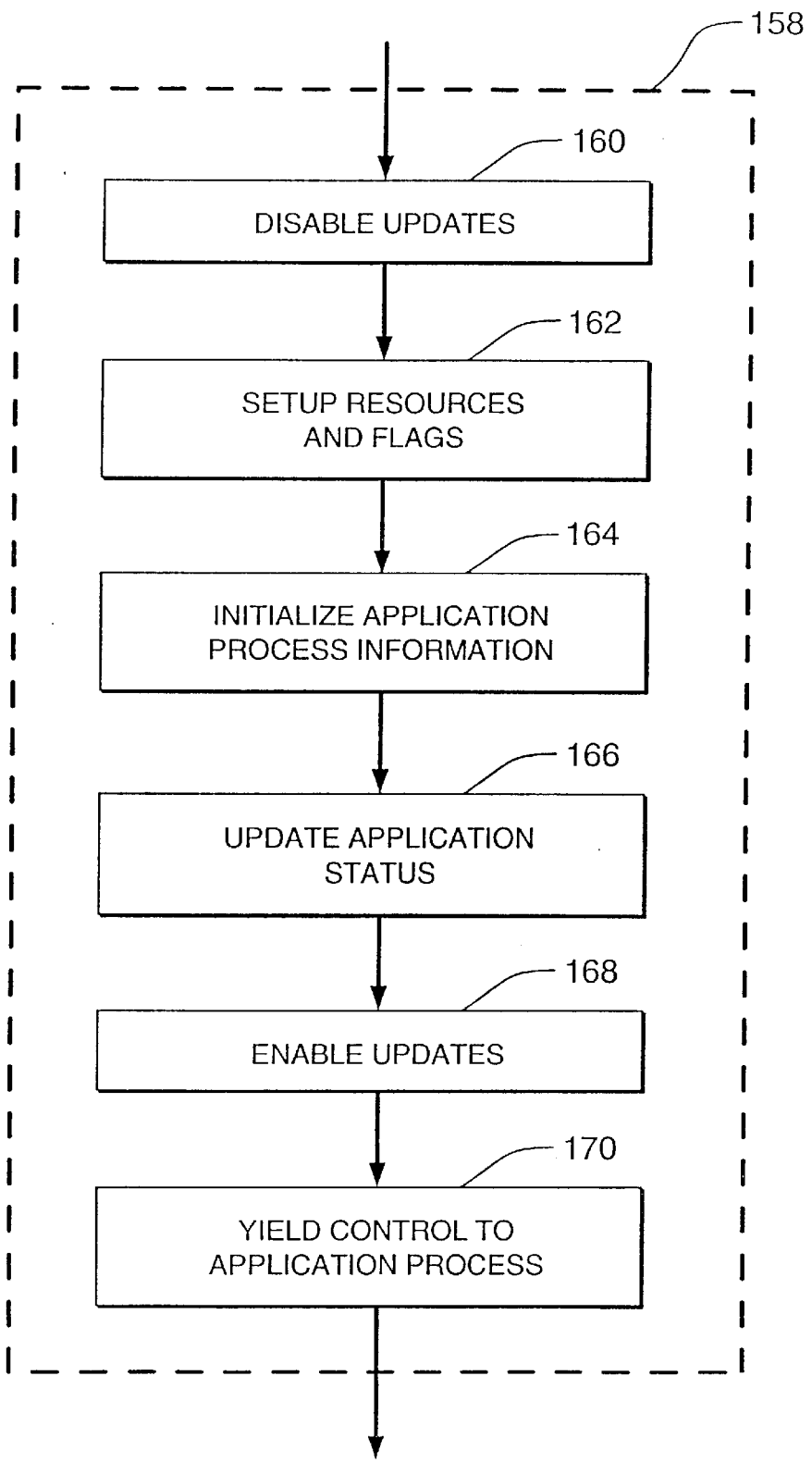
FIG. 9 is a flowchart further illustrating an application launching step shown in FIG. 8.

With reference to FIGS. 2, 8, and 9, the step 140 of launching the auto start applications 23 includes repeated performance of a launching step 158, with one repetition being performed for each application 23 specified in the auto start attribute of the desktop 52. The step 150 of launching a user-selected application 23 includes a single performance of the launching step 158.

In the embodiment illustrated, the launching step 158 includes a disabling step 160 which disables both the application status updating step 152 and the automatic icon updating step 156. Disabling the updating steps 152 and 156 simplifies subsequent steps of the launching step 158 by preventing inconsistencies in the launcher 50's status information.

During a setup step 162, a resource setup routine then sets up resources needed by the application 23 that is being launched. The setup step 162 also sets standard flags that communicate with operating system process creation routines. The setup step 162 is described further below in connection with FIG. 10.

A process initialization step 164 invokes an operating system routine or other process initializer to initialize a process control block or similar process control structure used by the operating system. The step 164 also allocates a processor to a process, task, or thread corresponding to the application 23. In an embodiment tailored to the Windows environment, the step 164 includes a call to ShellExecute() or CreateProcess().

An update status step 166 then updates the launcher 50's internal application status information to indicate that the application 23 has been launched. In one embodiment, the step 166 also records a process ID, instance handle, task handle, or other process identifier supplied by successful completion of the process initializer call in the step 164.

An enabling step 168 then reverses the disabling effects of the step 160. This allows the updating steps 152 and 156 to proceed again. If the user interface was changed during the step 160 to indicate that launching is underway, such as by displaying an hourglass cursor, then that change is also reversed by the step 168.

During a yielding step 170, a control transferor transfers control of a processor in the network to the process initialized during the step 164. The launcher 50 suspends itself, invokes a sleep function, or otherwise yields control of the processor to the newly launched process of the application 23 to allow execution of the application program. In one embodiment tailored to the Windows environment, the step 170 includes a call to Yield().

Those of skill in the art will recognize that other embodiments of the invention may include different steps which accomplish substantially the same results as the steps 160 through 170. For instance, the step 164 may be combined with the step 170 in environments which provide a single system call to create a new process and pass control to that process. In some such embodiments the relative order of the steps 162 and 166 is reversed. In addition, the disabling step 160 and the enabling step 168 are omitted in embodiments which do not use interrupt or event paradigms. That is, the steps 160 and 168 are omitted when there is no risk of creating inconsistent status information in the launcher 50 during the step 158.

Figure 10:
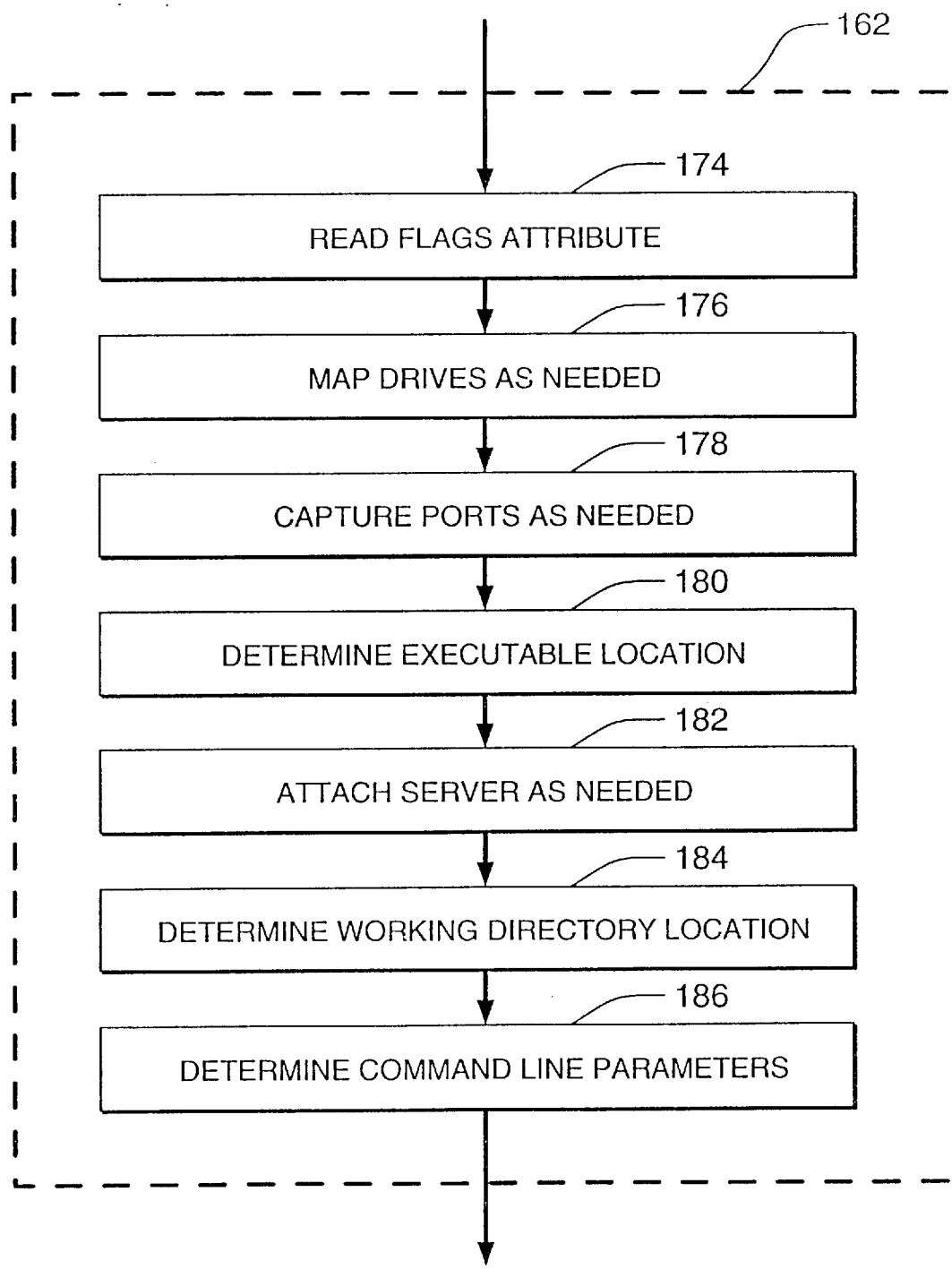
FIG. 10 is a flowchart further illustrating a resource setup step shown in FIG. 9.
Figure 11:
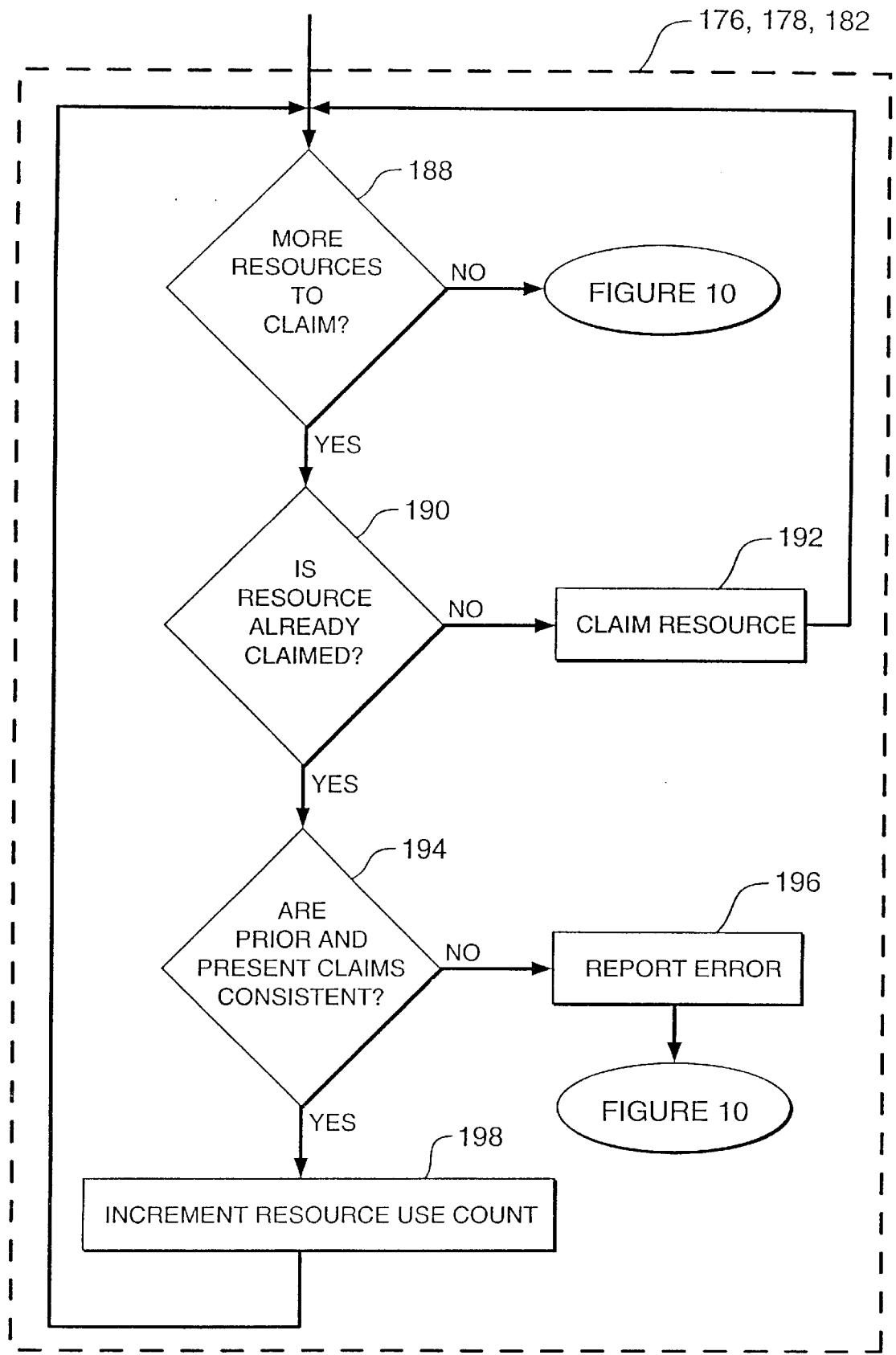
FIG. 11 is a flowchart further illustrating drive mapping, port capturing, and server attaching steps shown in FIG. 10.

With reference to FIGS. 2, 10, and 11, a reading step 174 reads the value of the flags attribute. If the minimize flag is set, the launcher 50 launches the application 23 telling it to run minimized.

A drive mapping step 176 follows the sequence described in FIG. 11. In the drive mapping step 176 the "resources" referred to in FIG. 11 are disk drives and the step of "claiming" includes mapping a drive. A port capturing step 178 likewise follows the sequence described in FIG. 11, but in the step 178 the resources are printer ports and the step of claiming includes capturing a printer port for use by the application 23. After a step 180 which determines the location of the executable code for the application 23, an attaching step 182 also follows the sequence described in FIG. 11. In the attaching step 182, the resources are servers 14 (FIG. 1) and the step of claiming includes attaching the desktop 52 to a server 14 that contains the application 23's executable code.

In one embodiment, the step 180 of determining the executable code location utilizes both the value of the file path attribute of the application object and the result of processing references to attributes or environment variables. One suitable format is the same as that used in login or other scripts, possibly with a distinguished name prefix. In other embodiments the step 180 does not reference environment variables. In environments that support UNC names, the step 180 preferably includes string manipulations to create an UNC name.

In one embodiment, a step 184 of determining the location of the application's working directory utilizes both the value of the working directory attribute of the application object and the result of processing attributes or environment variables. In other embodiments environment variables are not referenced. The step 184 may also include a conversion to the UNC format.

Likewise, a step 186 of determining the command line parameters may utilize both the value of the parameters attribute of the application object and the result of processing attributes or environment variables. Alternatively, environment variables may be ignored.

FIG. 11 illustrates the structure of each of the steps 176, 178, and 182 of FIG. 10. A querying step 188 determines whether additional resource claims made by the application 23 have not yet been addressed. Thus, in the drive mapping step 176, the querying step 188 determines whether any additional drives need to be mapped by checking to see if all of the mappings listed in the drive mappings attribute have been addressed by the launcher 50. In the port capturing step 178, the querying step 188 similarly determines whether any additional printer ports need to be captured by checking the printer ports attribute, and in the server attaching step 182, the querying step 188 determines whether any additional servers 14 (FIG. 1) need to be attached by checking the file path attribute.

If another resource (drive, port, or server) needs to be claimed by the application 23 that is being launched and a second querying step 190 determines that the resource has not been claimed by any process, then a claiming step 192 claims the resource for the application 23. To make its determinations, the second querying step 190 examines the internal status information of the launcher 50 during the drive mapping step 176 and the port capturing step 178, and calls NWGetConnectionStatus() during the attaching step 182.

In the drive mapping step 176, the claiming step 192 provides substantially the same functionality as the familiar DOS map command. In the port capturing step 178, the claiming step 192 provides substantially the same functionality as the familiar DOS capture command. In one embodiment of the server attaching step 182, the claiming step 192 calls NWAttachToFileServer() to create a server 14 attachment.

If the second querying step 190 determines that the resource has already been claimed by the application 23 being launched or by another process, a third querying step 194 is taken. The step 194 determines whether the previous claim and the claim sought by the application 23 are consistent. In the drive mapping step 176, the third querying step 194 passes control to an error reporting step 196 if the drive assignments already made differ from those requested in a manner that prevents any drive listed in the drive mappings attribute from being mapped. In the port capturing step 178, the third querying step 194 similarly compares previously made port assignments with those listed in the application's printer ports attribute. However, in the server attaching step 182, the third querying step 194 typically finds no error because desktops 52 can be simultaneously attached to more than one server 14.

If the resource was previously claimed and that previous claim is consistent with the needs of the application 23 now being launched, an incrementing step 198 increments a use counter that is maintained within the launcher 50. Thus, resources are only claimed as often as needed by the launcher 50 on behalf of applications 23. In particular, unnecessary multiple attachments to the same server 14 are avoided. During the clean up step 154 (FIG. 8), the use count is decremented unless the flags attribute indicates otherwise. The resource is freed only when the use count reaches zero.

With reference to all Figures, articles of manufacture within the scope of the present invention include a computer-readable storage medium in combination with the specific physical configuration of a substrate of the computer-readable storage medium. The substrate configuration represents data and instructions which cause the computers 14 and 16 to operate in a specific and predefined manner as described herein. Suitable storage devices include floppy disks, hard disks, tape, CD-ROMs, RAM, and other media 11 (FIG. 1) readable by one or more of the computers 14, 16. Each such medium tangibly embodies a program, functions, and/or instructions that are executable by the machines 14 and/or 16 to perform application managing steps of the present invention substantially as described herein.

In summary, as illustrated in FIG. 2 the present invention provides a computer-implemented method and apparatus for consistently tracking and employing information about application programs 23 and their execution environments in the network 10. Consistency is achieved by gathering the execution environment information into the application objects 49 and desktop objects 51 in the database 38, and by routing database 38 accesses through specially tailored tools such as the NWAdmin snap-in 54, the desktop 52 interface, and the application launcher 50. Database 38 and desktop 52 updates and refreshes are performed with the application management routines 48 and the application launcher 50, thereby reducing the effort associated with changes in the location of application program 23 executable codes or changes in the other information needed to execute the applications 23.

The invention may be embodied in other specific forms without departing from its spirit or essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes which come within the meaning and range of equivalency of the claims are to be embraced within their scope.

What is claimed and desired to be secured by patent is:

1. An application launcher for launching an application program in a computer network, the application launcher comprising:

a resource setup routine for setting up network resources for use by the application program;

a process initializer for causing an operating system to initialize a process control structure for the application program; and a routine which reads configuration settings from a launcher configuration attribute located in a hierarchical synchronized-partition database of network resources.

2. The application launcher of claim 1, wherein the configuration settings comprise a flag controlling manual icon refresh by a user.

3. The application launcher of claim 1, wherein the configuration settings comprise a flag controlling automatic icon refresh.

4. The application launcher of claim 1, wherein the configuration settings comprise a value controlling the number of container levels to search for application objects.

5. An application launcher for launching an application program in a computer network, the application launcher comprising:

a resource setup routine for setting up network resources for use by the application program; and a process initializer for causing an operating system to initialize a process control structure for the application program;

wherein the resource setup routine accesses a hierarchical database to determine which network resources to set up.

6. The application launcher of claim 5, wherein the hierarchical database includes synchronized partitions.

7. The application launcher of claim 5, wherein the hierarchical database includes a directory services database.

8. The application launcher of claim 5, wherein the hierarchical database supports attribute inheritance.

9. The application launcher of claim 5, wherein the hierarchical database is defined at least in part by an API-extensible schema.

10. The application launcher of claim 5, wherein the hierarchical database includes an application object.

11. The application launcher of claim 10, wherein the application object is platform-specific to a Microsoft® Windows™ environment.

12. The application launcher of claim 11, wherein the application object has a plurality of attributes, each attribute has a name, a syntax, and a current value, the syntax limits the values assumed by the attribute, the resource setup routine is capable of reading attribute values, and the plurality of attributes comprises:

a file path attribute having a string attribute syntax and having as its current value at least one location of an executable code of the application program; and a common name attribute having a string attribute syntax and having as its current value a textual name briefly identifying the application program.

13. The application launcher of claim 12, wherein the plurality of attributes further comprise an icon attribute.

14. The application launcher of claim 12, wherein the plurality of attributes further comprise a working directory attribute.

15. The application launcher of claim 12, wherein the plurality of attributes further comprise a flags attribute.

16. The application launcher of claim 12, wherein the plurality of attributes further comprise a blurb attribute.

17. The application launcher of claim 12, wherein the plurality of attributes further comprise a startup script attribute.

18. The application launcher of claim 12, wherein the plurality of attributes further comprise a shutdown script attribute.

19. The application launcher of claim 12, wherein the plurality of attributes further comprise a licensing attribute.

20. The application launcher of claim 12, wherein the plurality of attributes further comprise a command line parameters attribute.

21. The application launcher of claim 12, wherein the plurality of attributes further comprise a drive mappings attribute.

22. The application launcher of claim 12, wherein the plurality of attributes further comprise a printer ports attribute.

23. The application launcher of claim 12, wherein the plurality of attributes further comprise a contacts attribute.

24. The application launcher of claim 12, wherein the plurality of attributes further comprise a handler attribute.

25. The application launcher of claim 12, wherein the plurality of attributes further comprise a searchmap path attribute.

26. The application launcher of claim 12, wherein the plurality of attributes further comprise a catch-all attribute.

\* \* \* \* \*